United States Patent [19]
Epstein

[11] 3,983,495
[45] Sept. 28, 1976

[54] DIGITAL WAVEFORM GENERATOR

[75] Inventor: Marvin Aaron Epstein, Monsey, N.Y.

[73] Assignee: International Telephone and Telegraph Corporation, Nutley, N.J.

[22] Filed: Sept. 29, 1975

[21] Appl. No.: 617,545

[52] U.S. Cl. ................................. 328/34; 307/260; 307/262; 328/39; 328/60; 328/62; 332/10
[51] Int. Cl.² ..................... H03K 5/08; H03K 3/04; H03K 1/12
[58] Field of Search ................... 328/34, 39, 59, 60, 328/62; 307/208, 260, 262; 331/45, 60; 332/10

[56] References Cited
UNITED STATES PATENTS

| | | | |
|---|---|---|---|
| 3,581,115 | 5/1971 | Weber | 307/262 |
| 3,740,660 | 6/1973 | Davies, Jr. | 328/62 |

*Primary Examiner*—Stanley D. Miller, Jr.
*Attorney, Agent, or Firm*—John T. O'Halloran; Alfred C. Hill

[57] ABSTRACT

This generator generates $\cos(w_o + w_m)t$, $\sin(w_o + w_m)t$, $\cos(w_o - w_m)t$ and $\sin(w_o - w_m)t$ square wave waveforms. This is accomplished by inserting into a carrier square wave clock pulse stream one pulse with the cooperation of a modulation square wave clock in a first signal channel and by deleting from the carrier square wave clock pulse stream one pulse with the cooperation of the modulation square wave clock in a second signal channel. The resultant pulse stream in the first signal channel is suitably divided in a first binary divider and then further divided by a factor of two in a second binary divider to generate the $\cos(w_o + w_m)t$ waveform. The complement of the output waveform of the first binary divider is further divided by a factor of two in a third binary divider to generate the $\sin(w_o + w_m)t$ waveform. The resultant pulse stream in the second signal channel is similarly operated on to generate the $\cos(w_o - w_m)t$ and $\sin(w_o - w_m)t$ waveforms.

22 Claims, 2 Drawing Figures

3,983,495

DIGITAL WAVEFORM GENERATOR

BACKGROUND OF THE INVENTION

This invention relates to waveform generators and more particularly to waveform generators to generate $\cos(w_o + w_m)t$, $\sin(w_o + w_m)t$, $\cos(w_o - w_m)t$ and $\sin(w_o - w_m)t$ waveforms.

In the past waveform generators to produce the above-mentioned waveforms included multiple sine wave generators locked to a frequency standard by phase locked loops to form the appropriate sine and cosine waveforms.

The shortcomings of the prior art waveform generators is that the circuitry is analog and more complicated, there are inherent errors in maintaining the current phase relationship and there are problems in switching frequency.

SUMMARY OF THE INVENTION

An object of the present invention is to provide a digital waveform generator to generate $\cos(w_o + w_m)t$, $\sin(w_o + w_m)t$, $\cos(w_o - w_m)t$ and $\sin(w_o - w_m)t$ square wave waveforms.

A feature of the present invention is the provision of a digital waveform generator to generate $\cos(w_o + w_m)t$, $\sin(w_o + w_m)t$, $\cos(w_o - w_m)t$ and $\sin(w_o - w_m)t$ square wave waveforms comprising: a first source to provide a first square wave pulse stream having a first given frequency; a second source to provide a second square wave pulse stream having a second given frequency less than the first given frequency; first means coupled to the first and second sources to periodically insert one additional pulse into the first pulse stream to provide a first resultant pulse stream; second means coupled to the first and second sources to periodically delete one pulse from the first pulse stream to provide a second resultant pulse stream; third means coupled to the first means to divide the first resultant pulse stream by a first given division factor; fourth means coupled to the third means to divide the divided first resultant pulse stream by a factor of two to generate the $\cos(w_o + w_m)t$ waveform; fifth means coupled to the third means to divide the complement of the divided first resultant pulse stream by a factor of two to generate the $\sin(w_o + w_m)t$ waveform; sixth means coupled to the second means to divide the second resultant pulse stream by a second given division factor; seventh means coupled to the sixth means to divide the divided second resultant pulse stream by a factor of two to generate the $\cos(w_o - w_m)t$ waveform; and eighth means coupled to the sixth means to divide the complement of the divided second pulse stream by a factor of two to generate the $\sin(w_o - w_m)t$ waveform.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

This invention provides a generator which in a simple manner and with simple circuitry generates four related square wave waveforms suitably phase locked for correlation with an incoming received MSK (minimum shift keying) waveform. An MSK waveform has been described in the literature as a useful method of communication. In MSK the transmitted wave is a phase continuous frequency shift waveform. For each unit interval the instantaneous frequency is a constant being either a high frequency or a low frequency relative to a center frequency. The high frequency is such as to advance one revolution relative to the carrier or center frequency in four unit intervals. The low frequency is such as to fall behind by one revolution relative to the carrier or center frequency in four unit intervals. A set of correlation square wave waveforms which is useful for receiving and recovering information from an MSK waveform is $\cos(w_o + w_m)t$, $\sin(w_o + w_m)t$, $\cos(w_o - w_m)t$ and $\sin(w_o - w_m)t$, where $w_o$ is the radian frequency of the carrier, $w_m$ is the radian frequency difference between the high frequency and the carrier frequency, $t$ is time, T is the unit interval and $4w_m T = 2\pi$ radians. A useful phase requirement for such correlation waveforms is that the phase of $\cos(w_o + w_m)t$ and the phase of $\cos(w_o - w_m)t$ agree in phase at the end in every two unit intervals. A requirement which is useful in existing MSK communication networks is that the modulation frequency $w_m$ be variable. Factors of two such as 75 baud, 150 baud and 300 baud are commonly used.

Figure 1:
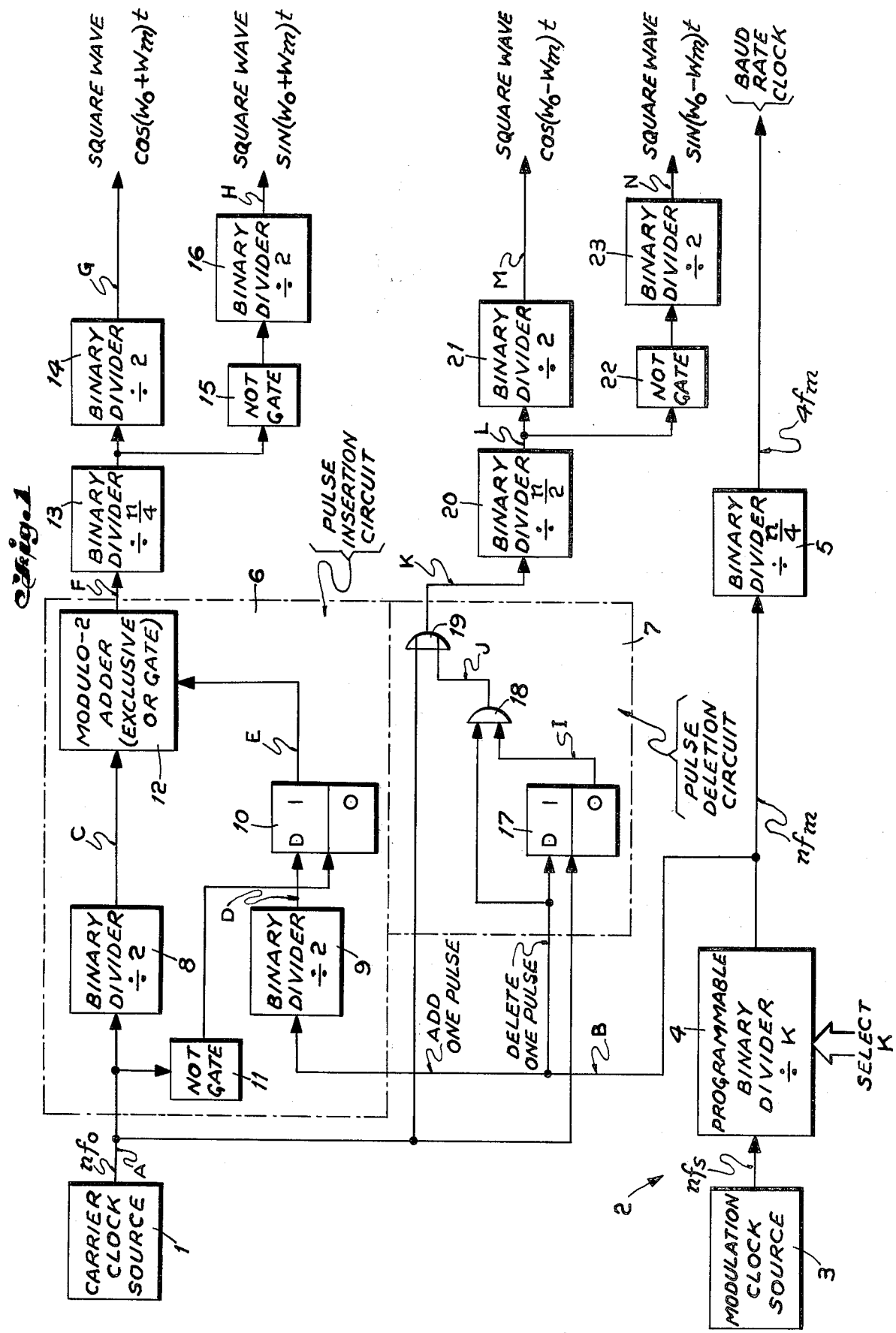
FIG. 1 is a block diagram of one embodiment of the digital waveform generator in accordance with the principles of the present invention.
Figure 2:
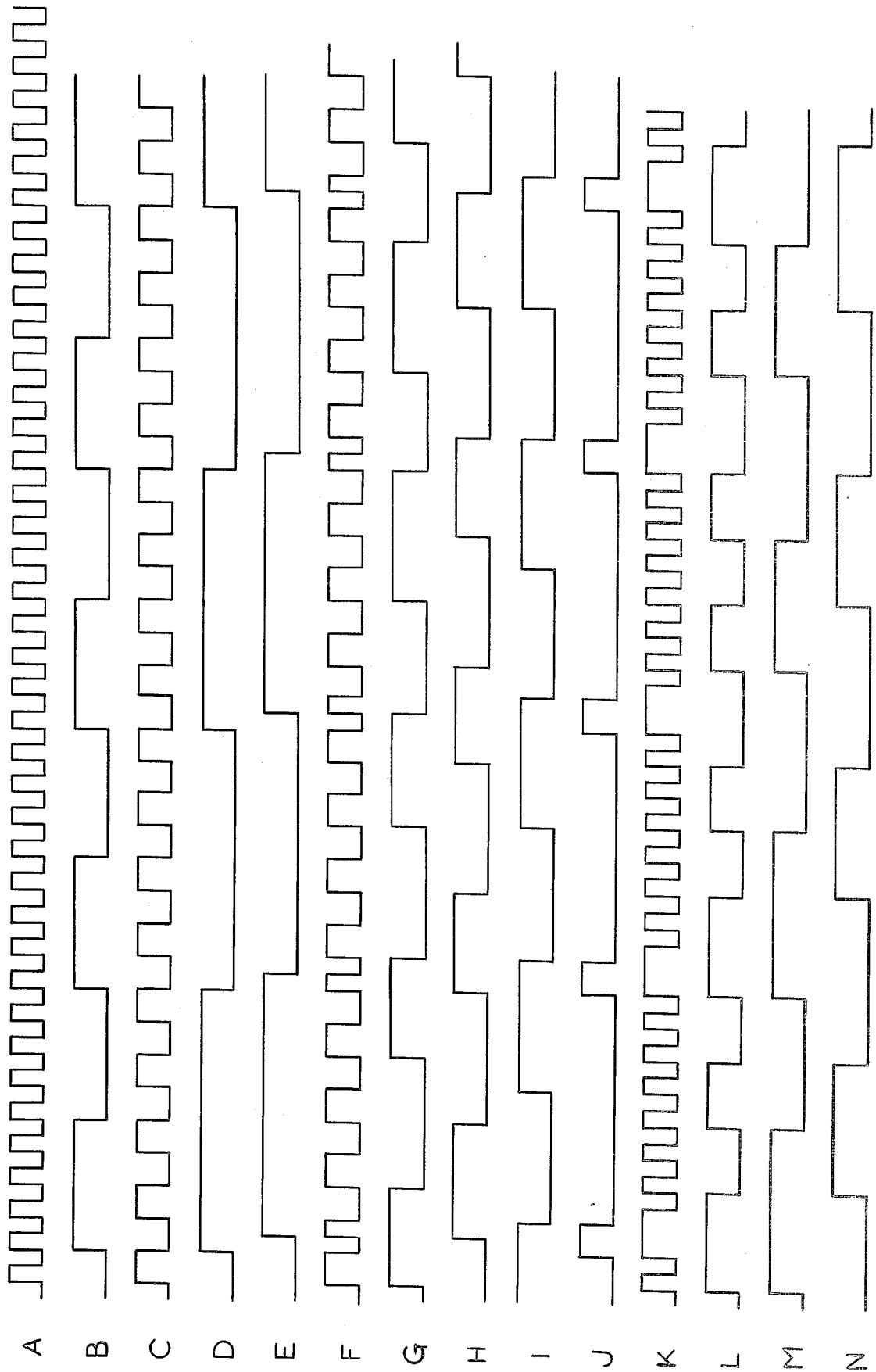
FIG. 2 is a timing diagram useful in explaining the operation of the generator of FIG. 1.

The purposed generator is an all digital device for producing square wave equivalents of the four desired correlation waveforms with suitable digital approximations. Referring to FIG. 1 there is illustrated in block diagram form the basic generator in accordance with the principles of the present invention. FIG. 2 is a timing diagram useful in explaining the operation of FIG. 1 with the letters identifying the curves of FIG. 2 being applied to the appropriate point of occurrence in FIG. 1 with the timing diagrams being drawn for purposes of illustration for $n = 4$.

Source 1 provides a carrier clock or pulse stream having a digital clock rate of $nf_o$, this pulse stream being illustrated in Curve A, FIG. 2. A source 2 including source 3 providing a modulation clock having a clock rate of $nf_s$ and a programmable binary divider 4 having a division factor K that can be selected to be any desired amount provides a modulation clock or pulse stream having a digital clock rate of $nf_m$, where $f_m$ is the frequency offset of the high frequency from the center or carrier frequency. Divider 4 may be implemented, for example, in accordance with the illustration of FIGS. 4 and 5 and the description thereof in the copending application of A. J. Seipel et al, Ser. No. 387,079, filed Aug. 9, 1973, and assigned to the same assignee as the present invention, whose disclosure is incorporated herein by reference. The output of source 2 is the output of divider 4.

The output of divider 4, $nf_m$, is illustrated in Curve B, FIG. 2, is divided by a factor of $n/4$ in binary divider 5 to generate the baud rate clock of $4f_m$.

The clock from source 1 is coupled to pulse insertion circuit 6 together with the clock from source 2. The clock from sources 1 and 2 are also coupled to pulse deletion circuit 7.

Pulse insertion circuit 6 includes binary divider 8 which divides the output of source 1 by a factor of two to produce the waveform shown in Curve C, FIG. 2. The output from source 2 is divided by a factor of two in binary divider 9 to produce a waveform as illustrated in Curve D, FIG. 2. This waveform is applied to the D input of a D-type flip-flop 10 and is clocked to the 1 output of flip-flop 10 by the complement of the output of source 1 provided by NOT gate 11. The waveform at the 1 output of flip-flop 10 is shown in Curve E, FIG. 2 and is modulo-2 added in modulo-2 adder 12 with the waveform at the output of divider 8 to produce the resultant pulse stream shown in Curve F, FIG. 2, which has one additional pulse or position going transition inserted therein when compared with the waveform of Curve C, FIG. 2. The waveform of Curve F, FIG. 2 at the output of adder 12 is applied to binary divider 13 having a division factor of $n/4$. In the example chosen for the timing diagram, where $n = 8$, divider 13 actually performs a divide-by-two function. The division factor for divider 13 is $n/4$ since a division by a factor of two took place in circuit 6 in dividers 8 and 9.

The output waveform of divider 13 (Curve F, FIG. 2 in the example employed) is divided by a factor of two by binary divider 14 to produce the waveform of Curve G, FIG. 2 which is a $COS(w_o + w_m)t$ square wave waveform. The complement of the output waveform of divider 13 as provided by NOT gate 15 is divided by a factor of two in binary divider 16 to provide the waveform illustrated in Curve H, FIG. 2 which is a $SIN(w_o + w_m)t$ square wave waveform.

The pulse deletion circuit 7 includes a D-type flip-flop 17 which has applied to the D-input thereof the output of divider 4 (Curve B, FIG. 2) which is clocked to the 0 output of flip-flop 17 by the output of source 1 (Curve A, FIG. 2). The waveform at the 0 output of flip-flop 17 is illustrated in Curve I, FIG. 2. This waveform together with the waveform from the output of divider 4 is coupled to AND gate 18 which produces a waveform as illustrated in Curve J, FIG. 2. This waveform together with the waveform at the output of source 1 is applied to OR gate 19 to generate the waveform illustrated in Curve K, FIG. 2.

The waveform at the output of OR gate 19 is divided by a factor $n/2$ in binary divider 20 which provides the output waveform as illustrated in Curve L, FIG. 2. The division factor $n/2$ of divider 20 is needed because no division by a factor of two takes place in circuit 7 as it did in circuit 6.

The output waveform of divider 12 is divided by a factor of two in binary divider 21 generating the waveform as illustrated in Curve M, FIG. 2 which is a $COS(w_o - w_m)t$ square wave waveform. The complement of the waveform at the output of divider 20 as provided by NOT gate 22 is divided by a factor of two in binary divider 23 to produce the waveform illustrated in Curve N, FIG. 2 which is a $SIN(w_o - w_m)t$ square wave waveform.

As illustrated in FIG. 2, each upward or positive going transition of the modulation clock or pulse stream of Curve B, FIG. 2 will delete or add one pulse to the carrier clock or pulse stream shown in Curve A, FIG. 2 with the deletion and addition of the pulses being shown in Curves K and F, FIG. 2, respectively. Therefore, the signal at the output of source 1 has $n(f_o + f_n)$ pulses per second on the average and the $COS(w_o + w_m)t$ square wave has $(f_o + f_m)$ pulses per second. Each pulse inserted by circuit 6 will cause the square wave at the output of divider 13 to advance by $1/nf_o$ seconds on the average or by $1/n$ revolutions of phase on the average. Each pulse deleted by circuit 7 will cause the square wave at the output of divider 20 to fall behind by $1/nf_o$ seconds on the average or by $1/n$ revolutions of phase on the average.

By increasing $n$, the phase jitter can be reduced to as small an amount as desired. If $nf_m$ is a multiple of $2f_o$ than there will be no phase jitter on the transitions of the four output correlation waveforms.

The correct phasing among the four output waveforms and the band clock can be produced by initially clearing all the dividers. The appropriate cosine and sine relationship for these waveforms is provided by complementing or not complementing the waveforms at the output of dividers 13 and 20 before the final "divide by 2" circuits 14, 16, 21 and 23.

While I have described above the principles of my invention in connection with specific apparatus it is to be clearly understood that this description is made only by way of example and not as a limitation to the scope of my invention as set forth in the objects thereof and in the accompanying claims.

I claim:

1. A digital waveform generator to generate $COS(w_o + w_m)t$, $SIN(w_o + w_m)t$, $COS(w_o - w_m)t$ and $SIN(w_o - w_m)t$ square wave waveforms comprising:

a first source to provide a first square wave pulse stream having a first given frequency;

a second source to provide a second square wave pulse stream having a second given frequency less than said first given frequency;

first means coupled to said first and second sources to periodically insert one additional pulse into said first pulse stream to provide a first resultant pulse stream;

second means coupled to said first and second sources to periodically delete one pulse from said first pulse stream to provide a second resultant pulse stream;

third means coupled to said first means to divide said first resultant pulse stream by a first given division factor;

fourth means coupled to said third means to divide said divided first resultant pulse stream by a factor of two to generate said $COS(w_o + w_m)t$ waveform;

fifth means coupled to said third means to divide the complement of said divided first resultant pulse stream by a factor of two to generate said $SIN(w_o + w_m)t$ waveform;

sixth means coupled to said second means to divide said second resultant pulse stream by a second given division factor;

seventh means coupled to said sixth means to divide said divided second resultant pulse stream by a factor of two to generate said $COS(w_o - w_m)t$ waveform; and eighth means coupled to said sixth means to divide the complement of said divided second pulse stream by a factor of two to generate said $SIN(w_o - w_m)t$ waveform.

2. A generator according to claim 1, wherein said first means inserts said one additional pulse at a rate proportional to said second given frequency.

3. A generator according to claim 1, wherein said second means deletes said one pulse at a rate proportional to said second given frequency.

4. A generator according to claim 3, wherein said first means inserts said one additional pulse at a rate proportional to said second given frequency.

5. A generator according to claim 1, wherein said first means includes
a first binary divider coupled to said first source to divide said first pulse stream by a factor of two,
a first inverting means coupled to said first source to invert said first pulse stream,
a second binary divider coupled to said second source to divide said second pulse stream by a factor of two,
a first D-type flip-flop having a 1 output coupled to said first inverting means and said second binary divider, said first flip-flop having the output signal from said second binary divider clocked to said 1 output of said first flip-flop by the output signal of said inverting means, and
a modulo-2 adder coupled to said first binary divider and said 1 output to provide said first resultant pulse stream.

6. A generator according to claim 5, wherein said second means includes
a second D-type flip-flop having a 0 output coupled to said first and second sources, said second flip-flop having said second pulse stream clocked to said 0 output by said first pulse stream,
an AND gate coupled to said 0 output and said second source, and
an OR gate coupled to said first source and the output of said AND gate to provide said second resultant pulse stream.

7. A generator according to claim 6, wherein said first given frequency is $nf_o$, where $n$ is an integer greater than one and $f_o$ is a selected carrier frequency,
said second given frequency is $nf_m$, where $f_m$ is a selected modulation frequency,
said third means is a first binary divider and said first given division factor is $n/4$, and
said sixth means is a second binary divider and said second given factor is $n/2$.

8. A generator according to claim 7, wherein said fifth means includes
a second inverter means coupled to the output of said third means.

9. A generator according to claim 8, wherein said eighth means includes
a second inverter means coupled to the output of said sixth means.

10. A generator according to claim 5, wherein said first given frequency is $nf_o$, where $n$ is an integer greater than one and $f_o$ is a selected carrier frequency,
said second given frequency is $nf_m$, where $f_m$ is a selected modulation frequency,
said third means is a first binary divider and said first given division factor is $n/4$, and
said sixth means is a second binary divider and said second given division factor is $n/2$.

11. A generator according to claim 10, wherein said fifth means includes
a first inverter means coupled to the output of said third means.

12. A generator according to claim 11, wherein said eighth means includes
a second inverter means coupled to the output of said sixth means.

13. A generator according to claim 1, wherein said second means includes
a D-type flip-flop having a 0 output coupled to said first and second sources, said flip-flop having said second pulse stream clocked to said 0 output by said first pulse stream,
an AND gate coupled to said 0 output and said second source, and
an OR gate coupled to said first source and the output of said AND gate to provide said second resultant pulse stream.

14. A generator according to claim 13, wherein said first given frequency is $nf_o$, where $n$ is an integer greater than one and $f_o$ is a selected carrier frequency,
said second given frequency is $nf_m$, where $f_m$ is a selected modulation frequency,
said third means is a first binary divider and said first given division factor is $n/4$, and
said sixth means is a second binary divider and said second given division factor is $n/2$.

15. A generator according to claim 14, wherein said fifth means includes
a first inverter means coupled to the output of said third means.

16. A generator according to claim 15, wherein said eighth means includes
a second inverter means coupled to the output of said sixth means.

17. A generator according to claim 1, wherein said first given frequency is $nf_o$, where $n$ is an integer greater than one and $f_o$ is a selected carrier frequency,
said second given frequency is $nf_m$, where $f_m$ is a selected modulation frequency,
said third means is a first binary divider and said first given division factor is $n/4$, and
said sixth means is a second binary divider and said second given division factor is $n/2$.

18. A generator according to claim 17, wherein said fifth means includes
a first inverter means coupled to the output of said third means.

19. A generator according to claim 18, wherein said eighth means includes
a second inverter means coupled to the output of said sixth means.

20. A generator according to claim 1, wherein said fifth means includes
a first inverter means coupled to the output of said third means.

21. A generator according to claim 20, wherein said eighth means includes
a second inverter means coupled to the output of said sixth means.

22. A generator according to claim 1, wherein said eighth means includes
an inverter means coupled to the output of said sixth means.

* * * * *